Aug. 23, 1966     B. C. DOUGLAS     3,268,695

HEAT CONTROL SYSTEM

Filed Dec. 30, 1963     3 Sheets-Sheet 1

Bradley C. Douglas,
Inventor.

Koenig, Pope, Senniger and Powers,
Attorneys.

United States Patent Office 3,268,695
Patented August 23, 1966

3,268,695
HEAT CONTROL SYSTEM
Bradley C. Douglas, Kirkwood, Mo., assignor, by mesne assignments, to Aurora Corporation of Illinois, Chicago, Ill., a corporation of Illinois
Filed Dec. 30, 1963, Ser. No. 334,379
11 Claims. (Cl. 200—140)

This invention relates to control systems for heating apparatus, and with regard to certain more specific features, to an electrically controlled system of this class.

Among the several objects of this invention may be noted the provision of an electromechanical regulating system for temperature control of ovens for gas and electric ranges and the like; the provision of a system of the class described adapted for manually or automatically programmed temperature control throughout both low- and high-temperature ranges, as desired, wherein the low range is useful for example, for food warming, defrosting and the like; and the provision of an electrically controlled system of the class described which lends itself to simpler and lower-cost apparatus for obtaining the desired dual control. Other objects and features will be in part apparent and in part pointed out hereinafter.

The invention accordingly comprises the mechanical and electrical elements and combinations of such elements, features of construction, and arrangements of parts and circuits which will be exemplified in the constructions hereinafter described, and the scope of which will be indicated in the following claims.

In the accompanying drawings, in which one of various possible embodiments of the invention is illustrated, FIG. 1 is a wiring diagram;

Figure 3:
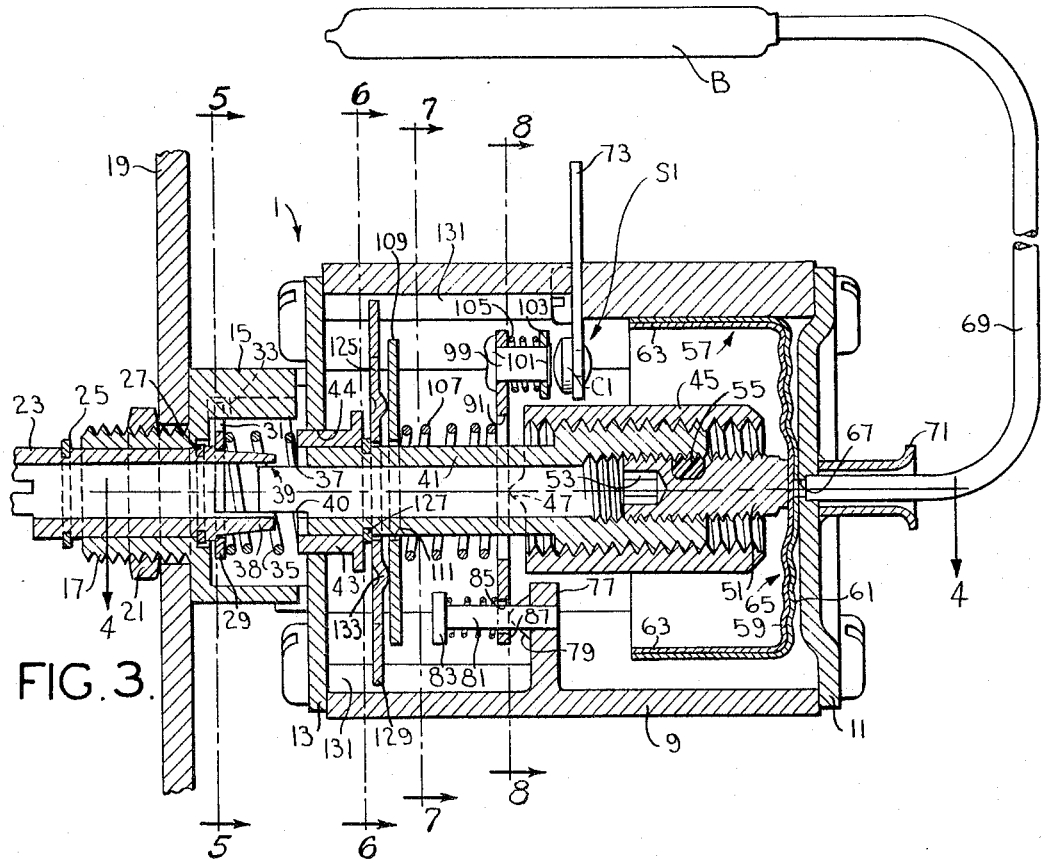
FIG. 3 is an axial vertical section taken on line 3—3 of FIG. 2.
Figure 4:
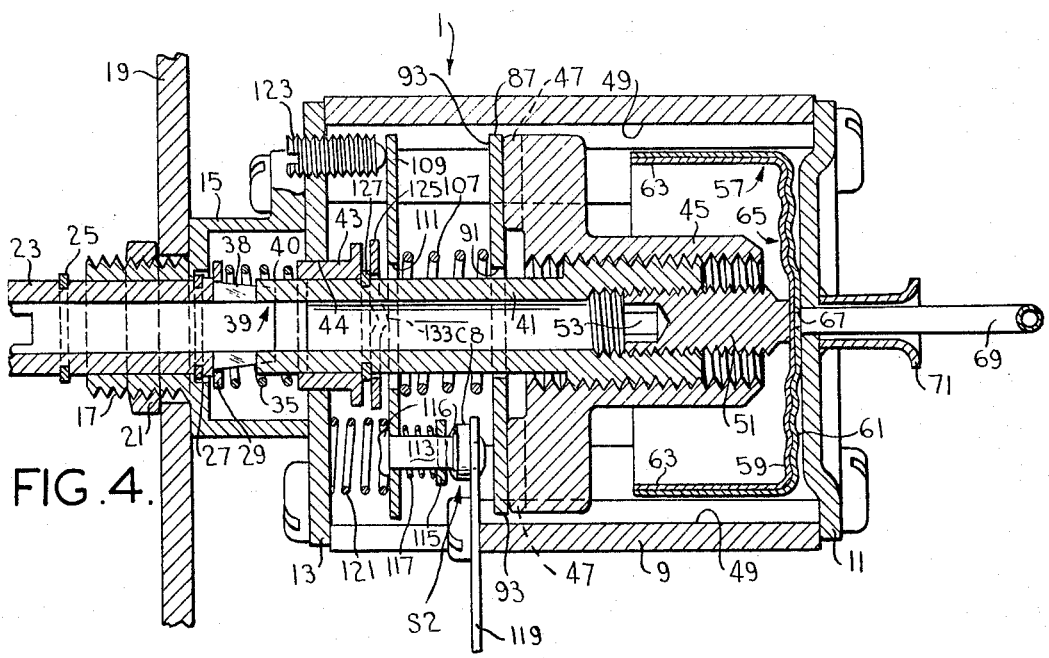
FIG. 4 is a horizontal section taken on lines 4—4 of FIGS. 2 and 3.
Figure 5:
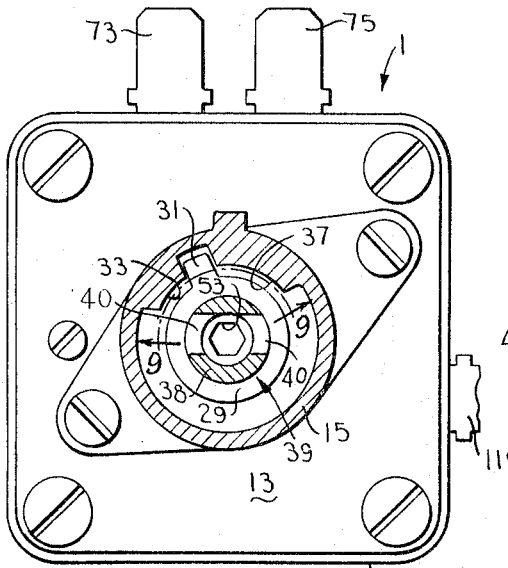
Figure 7:
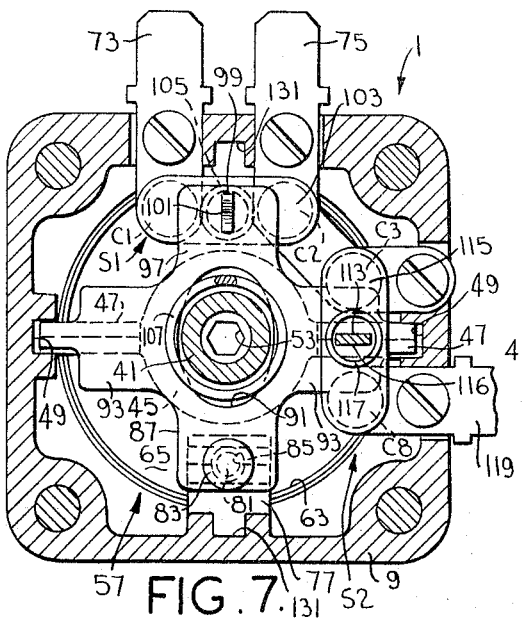
Figure 8:
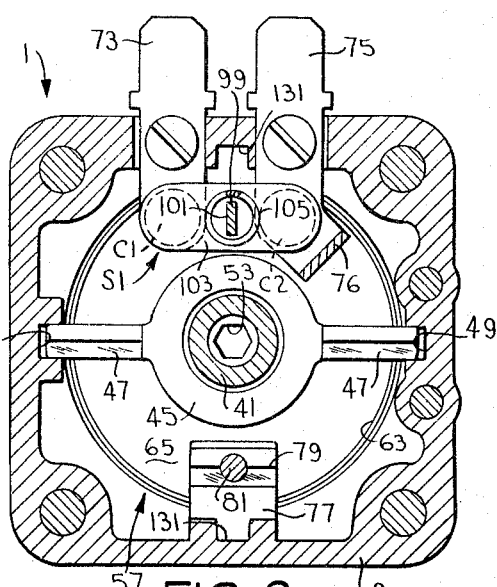
Figure 9:
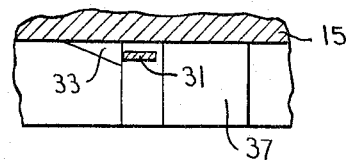

FIGS. 5, 6, 7 and 8 are cross sections taken on lines 5—5, 6—6, 7—7 and 8—8, respectively, of FIG. 3; and FIG. 9 is a detail section taken on line 9—9 of FIG. 5.

Corresponding reference characters indicate corresponding parts throughout the several views of the drawings.

Although the invention described herein has general use, a particular use is for controlling the temperature of both electric and gas-heated ovens, in relation to which the invention will be described as an example.

Figure 1:
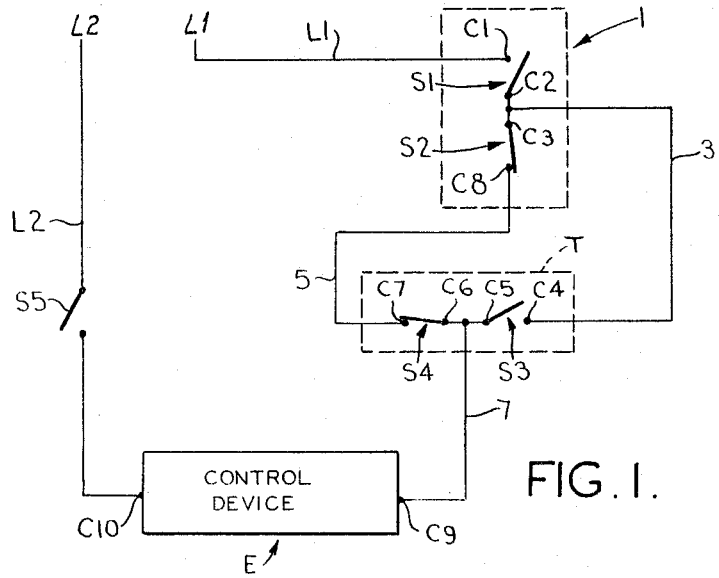

The heat-regulating system is diagrammatically shown in FIG. 1. In this figure, a thermostatic control device is generally indicated at 1. Device 1 contains two switches S1 and S2. As will appear, the actuation of switch S1 is dependent upon the setting of a control dial D (see FIG. 2) located on device 1, and upon the temperature around a fluid-filled temperature-responsive bulb B (see FIG. 3) located in the space to be heated, such as an oven. The actuation of switch S2 is dependent (after initial factory or service adjustment) only upon the operation of bulb B. Switch S1 may be referred to as a full-range or high-temperature switch, and switch S2 may be referred to as a limited low-range or low-temperature switch.

The system also includes a timing device T. Located within device T are two switches S3 and S4. Any of various types of electric control clocks or mechanisms may be utilized and can be set to open and close switches S3 and S4 independently of one another at various times, depending on the desired sequence of heating cycles. It is of course to be understood that manual operation of switches S3 and S4 may be substituted for operation by a timing device.

An electrical control device adapted to become operative upon energization is generally indicated at E. As mentioned previously, the heat-regulating system is adapted to control both electric and gas-heated ovens. In the case of an electric oven, device E may be an electromagnetic relay having at least one set of contacts which, when actuated, causes energization of the oven-heating apparatus. Preferably in such case the system should be operable under a low voltage, such as 12 volts, for example. If it is desired to make the control device E the oven heating element per se, the system may be constructed to operate under a higher voltage, such as 110 volts, for example. In the case of a gas oven, device E may be a solenoid-operated valve connected in a gas line between the gas supply and the oven burner. In any event, whenever device E is energized, heat is produced in the oven in an appropriate known manner.

A line L1 connects a power source (not shown) to a contact C1 of switch S1. A contact C2 of switch S1 is interconnected with a contact C3 of switch S2, and a line 3 connects both contacts C2 and C3 with a contact C4 of switch S3. A contact C5 is interconnected with a contact C6 of switch S4. A line 5 joins contact C7 to a contact C8 of switch S2. Contacts C5 and C6 are connected to one contact C9 of device E by line 7. The other contact C10 of device E is connected to the power source by a line L2. If the system is used in connection with a gas oven, a flame switch S5 is provided in line L2. Switch S5 is placed in heat-exchange relationship with the pilot burner (not shown) of the gas system. If the pilot burner is ignited, switch S5 will close, thereby permitting energization of device E. However, if the pilot burner becomes extinguished for some reason, switch S5 opens, thereby preventing energization of device E, and consequently preventing the flow of gas to the oven burner. It will be understood that if the system is used in connection with an electric oven, the flame switch is omitted.

The device E will be energized when the flame switch S5, if present, is closed and either of the following combinations of switches are closed, namely S1 and S3, or S1, S2 and S4.

Device 1 is shown in detail in FIGS. 2–9. It includes a hollow body or housing 9 having end plates 11 and 13 secured on its opposite ends. Housing 9 and plates 11 and 13 are formed of an electrically insulating material, such as a thermoset plastic, for example. A cap 15 is connected to end plate 13. Cap 15 has a tubular part 17 extending through a hole in the front panel 19 of the range. A lock nut 21 is threaded on part 17 on the outside of panel 19 for securing the entire device 1 to the panel.

Figure 2:
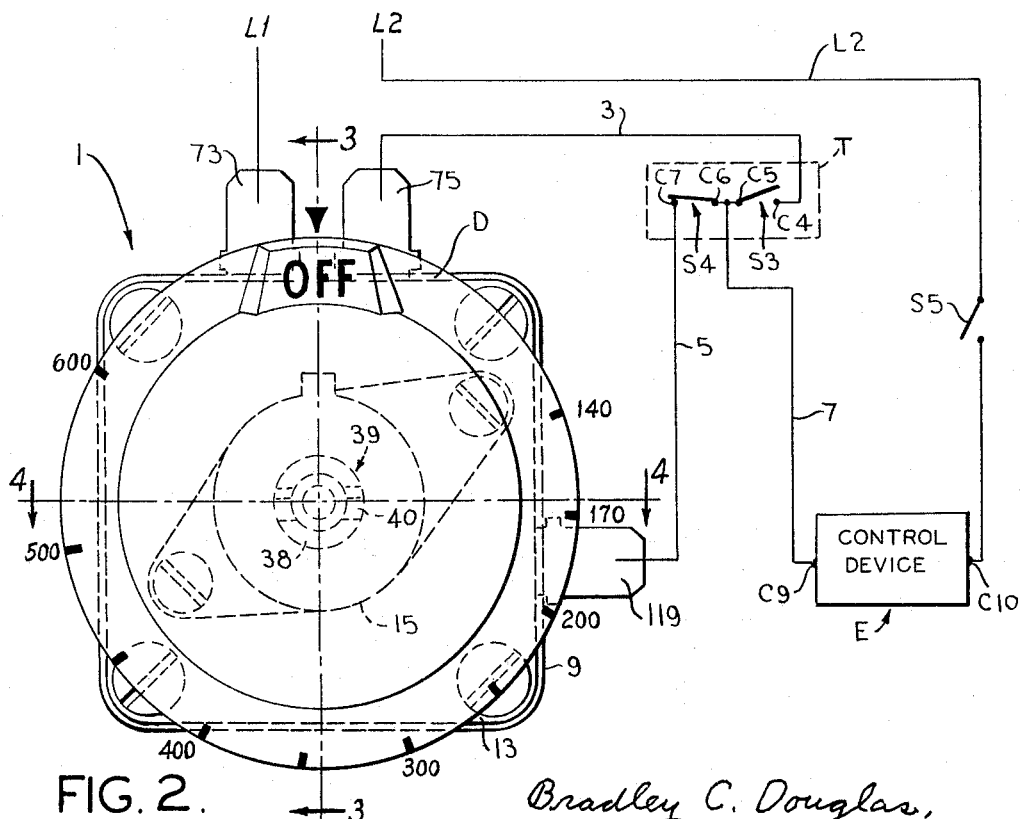
FIG. 2 is a similar wiring diagram showing appropriate connections with a thermostatic control device, the latter being shown in front end elevation.

A rotatable operating or control member 23 extends through part 17. Dial D is connected to the outer end of member 23. As shown in FIG. 2, the dial D is provided with lower temperature markings 140° F. and 170° F. and higher temperature markings 200° F.–600° F., the latter marking being indicative of broiling temperature.

Snap rings 25 and 27 surround member 23 on opposite sides of extension 17. The distance between rings 25 and 27 is slightly greater than the length of extension 17 to permit limited axial movement of member 23. Seated on a shoulder located inwardly of ring 27 is a washer 29. Washer 29 has a finger 31 (see FIGS. 3 and 5) extending radially outwardly therefrom. In the position shown in FIGS. 3 and 5, member 23 is prevented from counterclockwise movement (as viewed in FIGS. 1 and 5) by the engagement of finger 31 with a shoulder 33 on cap 15. To rotate member 23 counterclockwise it must be pushed inwardly, i.e., to the right as viewed in FIG. 3, to push finger 31 beyond shoulder 33. Once finger 31 has been pushed beyond shoulder 33, a spring 35 pushes washer 29 and member 23 outwardly into the normal outward position of member 23. Counterclockwise movement of member 23 is limited by the engagement of finger 31 with a stop 37 (see FIGS. 3, 5 and 9).

The inner end of member 23 carries lugs 38 which interdigitate with lugs 40 on a tubular control member 41 to form an axially splined connection 39 therebetween. A sleeve 43 surrounds the outer end of member 41 and has a sliding fit in a hole 44 in plate 13. Threaded on the inner end of member 41 is a wing nut 45, or actuating member, having laterally extending wings carrying knife-edges 47 (FIG. 8) riding in grooves 49 in housing 9. Counterclockwise rotation of dial D (as viewed in FIG. 2) causes actuating member 45 to be moved axially on member 41 (to the right as viewed in FIG. 3). An adjusting bolt or plug 51 is threaded in the inner end of tubular member 41. A hexagonal cavity 53 is provided in plug 51 for receiving an Allenhead wrench. Plug 51 is adapted to be adjusted axially relative to member 41 and is retained in any adjusted position by an insert 55 of material, such as nylon for example, adapted to engage the internal threads of member 41.

Plug 51 is in engagement with a double-walled cup 57 located within housing 9. Cup 57 has an inside wall 59 and an outside wall 61, the latter being soldered or otherwise attached to the inside of end plate 11. Marginal portions 63 of the cup members 59 and 61 are sealed together, as by welding or soldering, the remaining portions of the members 59 and 61 being unjoined. Both walls are corrugated in their portions forming the inside bottom 65 of cup 57. The outside member 61 is provided with an opening 67 communicating with a fluid line 69. Line 69 is sealed to the end plate 11 and a sleeve 71 surrounds the end of line 69. The other end of line 69 is connected to bulb B which, as previously stated, is located in the space to be heated. The bulb B, line 69 and available space between the members 59 and 61 are filled with a thermally responsive liquid which is adapted, upon expansion in response to heating, to enter between the members 59 and 61, so as to force them apart. This drives plug 51, tubular member 41 and wing nut 45 to the left, as viewed in FIG. 3. This action occurs against return action of spring 35 acting on sleeve 43, the sleeve 43 resting on a ring 127 held in a groove of tubular member 41.

Figure 6:
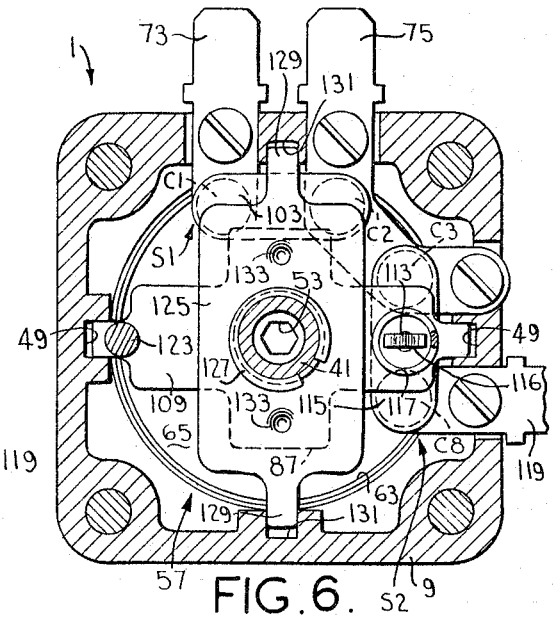

Two terminal-forming bus bars 73 and 75 extend through an upper wall of the housing 9 and are secured thereto by screws, for example. A contact C1 is mounted on the inner end of bus 73. Bus bar 75 carries contacts C2 and C3 (FIGS. 6 and 7). It has an offset as shown at 76 (FIG. 8). A post 77 extends inwardly from the lower wall of the housing 9 (FIGS. 3 and 8). Post 77 has a knife-edged fulcrum 79 extending toward the end plate 13. A pin 81 having an enlarged head 83 extends through a hole 85 in a contact-carrying actuating plate 87. The pin 81 is carried on post 77. A compression spring 89, located between head 83 and plate 87, maintains the latter in engagement with the knife-edge portion 79.

Plate 87 has an elliptical opening 91 (see FIG. 7) through which member 41 passes. Plate 87 also has laterally extending arms 93 which are engageable by knife-edges 47 on wings of nut 45. The outer ends of arms 93 ride in grooves 49 in the outside walls of housing 9. Secured to an upper arm 97 of plate 87 is a flat pin 99 which extends toward contacts C1 and C2. Pin 99 is peened at both ends as indicated at 101 and extends through a bridging contact 103 adapted to bridge or interconnect contacts C1 and C2. A spring 105 maintains bridging contact 103 against the peen 101 on the right end (FIG. 3) of pin 99. When dial D is in its off position and the oven is at room temperature, the relationship between members 41 and 45 is such that knife-edges 47 hold plate 87 in a nonbridging relationship with respect to contacts C1 and C2 (see FIG. 3). This opens switch S1. When dial D is rotated counterclockwise, member 45 is moved away from plate 87 and contact 101 bridges contacts C1 and C2. This closes switch S1. The distance nut 45 moves to the right away from plate 87 is determined by the temperature marking to which dial D is rotated. Movement of wing nut 45 to the left as a result of turning dial D toward its off position or the expansion of the termally responsive liquid in bulb B eventually causes engagement of knife-edge 47 with arms 93 of plate 87. Then further movement of wing nut 45 to the left causes plate 87 to pivot counterclockwise as viewed in FIG. 3 about fulcrum 79, thereby disengaging bridging contact 103 from contacts C1, C2.

Plate 87 is biased clockwise as viewed in FIG. 3 by a compression spring 107 surrounding tubular member 41. Spring 107 reacts against a contact-carrying actuating plate or arm 109. Plate 109 has a hole 111 through which member 41 passes. A flat pin 113 extends through a rectangular opening in one end of plate 109 and through the center of a bridging contact 115. Contact 115 is adapted to bridge or interconnect contacts C3 and C8. Pin 113 is peened on its ends as indicated at 116. A spring 117 maintains bridging contact 115 against the end of pin 113. Contact C8 is mounted on the inner end of a bus or terminal 119. A compression spring 121, extending between end plate 13 and one end of plate 109, biases the latter toward contacts C3 and C8. An adjustment screw 123 is threaded through end plate 13 and engages the opposite end of the plate 109.

A backing plate 125 is located between plate 109 and a snap ring 127 on member 41. Backing plate 125 has two arms 129 on its opposite ends which ride in grooves 131 in housing 9. Plate 125 is provided with dimples 133 which engage plate 109. Snap ring 127 acts as a stop for both backing plate 125 and sleeve 43. Screw 123 is adjusted so that bridging contact 115 interconnects contacts C3 and C8 whenever the temperature within the oven is below a predetermined temperature, such as 140° F. for example. Spring 107 maintains plate 109 in contact with dimples 133. As the oven temperature increases from room temperature toward 140° F., walls 59 and 61 of cup 57 separate and force plug 51, tubular member 41, wing nut 45, snap ring 127 and sleeve 43 to the left, as viewed in FIGS. 3 and 4. Spring 107 forces plates 109 and 125 to move left with member 41. However, adjustment screw 123 prevents the adjacent end of plate 109 from moving to the left. Accordingly, plate 109 will be pivoted clockwise, as viewed in FIG. 4, when the temperature within the oven reaches approximately 140° F. The clockwise pivoting movement of plate 109 is such that bridging contact 115 disconnects contacts C3 and C8, i.e., switch S2 will open. By varying the settings of plug 51 and/or adjustment screw 123, switch S2 may be made to open at any desired temperature within a low-temperature range of approximately 140° F.–170° F.

The operation of the system in use will now be explained. Assume first, for example, the simplest case in which a woman wishes to cook a roast for a period of two hours at 500° F., after which time she intends immediately to remove the roast. Assume further that the oven is at room temperature. Timer switches S3 and S4 are set so that initially switch S3 is closed and switch S4 is open. After two hours, the timing mechanism operates to open switch S3 without affecting switch S4, i.e., switch S4 remains open. With the dial in the off position, switch S1 is open and switch S2 is closed. The dial is turned counterclockwise (FIG. 2) to the 500° F. setting. This causes tubular member 41 to turn counterclockwise (FIG. 8). Since nut 45 is prevented from rotational movement by the fact that its wings 47 are located in grooves 49, it will, as viewed in FIG. 3, be moved to the right. This closes switch S1. Switch S2 remains closed. If the oven is heated by gas and the pilot light is burning, switch S5 is closed.

Control device E will be energized by the following circuit: line L1, switch S1, line 3, switch S3, line 7, device E and line L2. Accordingly, heat will be produced in the oven. As the temperature within the oven increases, the liquid in bulb B, line 69 and between parts 59 and 61 of cup 57 expands and forces the assembly comprising plug 51, tubular member 41, wing nut 45, snap ring 127 and sleeve 43 to the left. When the temperature reaches 140° F., for example, switch S2 will be opened, as described previously, but since switch S4 is open, the opening of switch S2 has no effect on the operation of the system. When the temperature within the oven has reached approximately 500° F., the wings 47 will engage the arms 93 of plate 87 and cause the latter to pivot counterclockwise (as viewed in FIG. 3), thereby opening switch S1. Opening of switch S1 deenergizes control device E and accordingly the oven temperature begins to drop. As the oven temperature drops a few degrees, the temperature-responsive liquid in bulb B and line 69 contracts and the combined effect of springs 35 and 107 causes switch S1 to close. Control device E is energized and oven temeprature within the oven rises again. The heating cycle is then continued in an on and off fashion for a period of two hours at which time S3 is opened, or dial D is turned clockwise, as viewed in FIG. 2, back to its off position. If switch S3 is opened, the control device E is deenergized and the oven temperature drops, even though switch S1 may be closed. When the dial D is turned to its off position, wing nut 45 is moved axially to the left, as viewed in FIG. 3, to engage plate 87 and open switch S1. Thus, regardless of whether switch S3 or switch S1 or both are opened, control device E is deenergized and the oven temperature drops. When the oven temperature drops to 140° F., switch S2 will be closed, but since switch S4 is open and/or switch S1 is open, control device E is not energized.

Consider second the situation wherein a woman wants to cook a roast at a temperature of 500° F. for a period of two hours, after which cooking period she wishes the roast automatically to be kept warm, say at 140° F., until she has time to remove it from the oven. The timer switches S3 and S4 are set so that initially switch S3 is closed and switch S4 is open. After two hours the timing mechanism operates to open switch S3 and close switch S4. The dial is turned counterclockwise, as described previously, to the 500° F. setting. As a result, switch S1 closes, causing energization of control device E. The control system then operates in the same manner as described above to maintain the oven temperature at approximately 500° F. At the end of two hours, switch S3 is opened and switch S4 is closed. Switch S2, since the oven temperature is above 140° F., is open. Switch S1 will close as the oven temperature drops below 500° F. However, since switches S2 and S3 are open, device E is not energized. When the oven temperature falls to approximately 140° F., switch S2 closes, as described previously. Thus a circuit through device E will be completed through switches S1, S2 and S4. If the oven temperature rises above 140° F. switch S2 opens, causing deenergization of device E. Control device E is then intermittently energized and deenergized upon the closing and opening operation of switch S2. Accordingly, the oven temperature is maintained at approximately 140° F. When the woman removes the roast she turns off the oven by opening switch S4 and/or turning the dial D clockwise back to its off position. If the dial D is turned to its off position, switch S1 is opened, thereby preventing energization of device E, even though switch S4 may be closed.

It will be seen in the second situation described above that switch S4 could remain closed throughout both the high- and low-temperature cycles without affecting the operation of the system. Thus, if it were desired to furnish a system primarily adapted to provide the temperature control necessary to fulfill the requirements of the second situation, switch S4 could be replaced by a direct connection between lines 5 and 7.

If a woman wishes only to warm some food at a temperature of 140° F., she merely turns dial D to the 140° F. setting and closes switch S3. When the dial is turned to the 140° F. setting, wing nut 45 is backed off slightly to the right, as viewed in FIG. 3. Switch S1 closes and a circuit is completed through device E. When the oven temperature reaches 140° F., wings 47 engage and cause plate 87 to open switch S1, thereby deenergizing device E. While switch S2 will also be opened and closed along with the opening and closing movements of switch S1, such operation has no effect on the system since switch S4 is open. Even if switch S4 is closed, the operation of switch S1 over-rides the operation of switch S2.

It will be seen that the operation of the control device E is controlled by the operation of the various switches S1, S2, S3, and S4, and in the case of a gas-heated oven, also switch S5.

It is to be understood that various other cooking cycles could be programmed by setting the switches S3 and S4 to open and close at various times.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermostatic control device comprising a hollow housing, first and second switches mounted in said housing, control means mounted for movement in said housing and actuating said switches upon such movement, and thermostatic means operatively connected to said control means, the thermostatic means being responsive to temperature changes in a zone outside said housing to move said control means for actuating said switches, said control means being adjustable for actuating said first switch in response to a selected high temperature, said second switch being actuated by said control means and said thermostatic means at a predetermined low temperature, said second switch comprising a pair of contacts spaced apart from one another and a switch arm, means pivotally mounting said switch arm in said housing, a bridging contact carried by said switch arm interconnecting said contacts upon movement of said switch arm in one direction and to disconnect said contacts upon movement of said switch arm in an opposite direction, and a spring biasing said switch arm in said opposite direction, said control means and said thermostatic means preventing sufficient movement of said switch arm in said opposite direction to disconnect said contacts when the temperature outside said housing is below said predetermined low temperature, and said control means and said thermostatic means permitting said spring to move said switch arm in said opposite direction to disconnect said contacts when the temperature outside said housing rises above said predetermined low temperature.

2. A thermostatic control device comprising a hollow housing, first and second switches mounted in said housing, control means mounted for movement in said housing and being operatively connected to said switches to actuate said switches upon such movement, thermostatic means operatively connected to said control means, the thermostatic means being responsive to temperature changes in a zone outside said housing to move said control means for actuating said switches, said control means beng adjustable for actuating said first switch in response to a selected high temperature, said second switch being actuated by said control means and said thermostatic means at a predetermined low temperature, said first switch comprising a pair of contacts spaced apart from one another, a first switch arm, means pivotally mounting said switch arm in said housing, a bridging contact carried by said switch arm interconnecting said contacts upon movement of said switch arm in one direction and disconnecting said contacts upon movement of said switch arm in an opposite direction, said control means moving said switch arm in said opposite direction in response to an increase in temperature outside said housing above said selected high temperature, said second switch comprising a second pair of contacts spaced apart from one another, a second switch arm, means pivotally mounting said second switch arm in said housing, a second bridging contact carried by said second switch arm interconnecting said second pair of contacts upon movement of said second switch arm in one direction and disconnecting said second pair of contacts upon movement of said second switch arm in an opposite direction, and a spring biasing said second switch arm in said opposite direction, said control means preventing sufficient movement of said second switch arm in said opposite direction to disconnect said second pair of contacts when the temperature outside said housing is below said predetermined low temperature, and said control means permitting said spring to move said second switch arm in said opposite direction to disconnect said second pair of contacts when the temperature outside said housing rises above said predetermined low temperature.

3. A heat-control system for use with heat-producing means, the system comprising first, second and third switches, the third switch being a timing switch having means connected to it for selectively actuating said third switch between closed and open positions after a predetermined time interval, a control device adapted to be connected with the heat-producing means and operable when actuated to render the heat-producing means operative, an electrical circuit interconnecting said switches with said control device, said second and third switches being in parallel with each other and in series with said first switch whereby the control device is actuated when said first switch is closed and one of said second and third switches is closed, manually operable means including a member engaging a portion of said first switch for closing said first switch and for preventing opening of said switch below a selected high temperature, and thermostatic means engaging said manually operable means to move the manually operable means and open said first switch in response to an increase in temperature above said high temperature, said manually operable means engaging a portion of said second switch and said thermostatic means actuating said manually operable means to maintain said second switch in a closed position below a predetermined low temperature and to permit said second switch to be actuated to an open position at a temperature above said low temperature.

4. A heat-control system for use with heat-producing means, the system comprising first, second and third switches, a housing, a control device adapted to be connected with the heat-producing means and operable when actuated to render the heat-producing means operative, an electrical circuit interconnecting said switches with said control device, said second and third switches being in parallel with each other and in series with said first switch whereby the control device is actuated when said first switch is closed and one of said second and third switches is closed, manually operable means including a member engaging a portion of said first switch for closing said first switch and for preventing opening of said switch below a selected high temperature, thermostatic means engaging said manually operable means to move the manually operable means and open said first switch in response to an increase in temperature above said high temperature, said manually operable means engaging a portion of said second switch and said thermostatic means actuating said manually operable means to maintain said second switch in a closed position below a predetermined low temperature and to permit said second switch to be actuated to an open position at a temperature above said low temperature, means connected to the third switch for selectively actuating said third switch between open and closed positions, said second switch being in said housing and comprising a pair of contacts spaced apart from one another and fixed relative to said housing, said portion of said second switch comprising a switch arm pivotally mounted within said housing, a bridging contact carried by said switch arm, first biasing means forcing said switch arm and its bridging contact into engagement with said pair of contacts at a temperature below said predetermined temperature, second biasing means acting on said switch arm oppositely to said first biasing means for forcing said switch arm and its bridging contact away from said pair of contacts, said manually operable means comprising rotatable means extending from the outside to the inside of said housing, and backing means on said rotatable means engaging said switch arm to prevent movement of the latter away from said pair of contacts by said second biasing means, said thermostatic means upon an increase in temperature above said predetermined low temperature moving said rotatable means axially to permit said second biasing means to force said switch arm and its bridging contact away from said pair of contacts.

5. A system as set forth in claim 3, further comprising a fourth switch interconnected in series with said second switch and connected in parallel with said third switch, means associated with said fourth switch for selectively actuating said fourth switch between open and closed positions, said fourth switch when open preventing said control device from being actuated when said first and second switches are closed and said third switch is open.

6. A system as set forth in claim 3, further comprising a housing, said first switch being in said housing and comprising a pair of contacts spaced apart from one another and fixed relative to said housing, said portion of said first switch comprising a switch arm pivotally connected to said housing, a bridging contact carried by said switch arm, means biasing said switch arm and its bridging contact toward said pair of contacts, said manually operable means comprising rotatable means extending from the outside to the inside of said housing, and said member being threaded on the inner end of said rotatable means, means preventing rotation of said member to cause movement of the latter axially of said rotatable means upon rotation of the latter, said member engaging said switch arm to oppose said biasing means, whereby said member upon rotation of said rotatable means in one direction moves away from said switch arm and permits said biasing means to move said switch arm toward said contacts.

7. A thermostatic control device as set forth in claim 2, wherein said control means comprises a means rotatably mounted in said housing, an actuating member threaded on the inner end of said rotatable means, means preventing rotation of said actuating member to cause movement of the latter axially of said rotatable means upon rotation of the latter, said spring biasing said first switch arm toward a closed position, said member upon rotation of said rotatable means in one direction moving away from said first switch arm, said thermostatic means upon an increase in temperature outside said housing moving said rotatable means and said member together toward said first switch arm, the member moving said first switch arm to open said first switch when the temperature outside said housing rises above said selected high temperature.

8. A thermostatic control device, comprising a hollow housing, a high-temperature switch mounted in said housing, a low-temperature switch mounted in said housing, said switches being spaced apart, a spring extending between said switches biasing the high-temperature switch toward a closed position and biasing the low-temperature switch toward an open position, and thermostatic control means operatively connected to said switches for maintaining said low-temperature switch in a closed position against the bias of said spring below a predetermined low temperature and for opening said high-temperature switch against the bias of said spring in response to an increase in temperature above a predetermined high temperature.

9. A thermostatic control device as set forth in claim 8, wherein said control means includes means for adjusting the temperatures at which each of said switches is actuated.

10. A thermostatic device as set forth in claim 9, wherein the means for adjusting the temperature at which said high-temperature switch is actuated includes a rotatable control member, an actuating member threaded on said control member, and means for preventing rotation of said actuating member, whereby said actuating member moves axially of said control member upon rotation of the latter.

11. A thermostatic device as set forth in claim 9, wherein said low-temperature switch includes a switch arm, and the means for adjusting the temperature at which said low-temperature switch is actuated includes a screw threaded through a wall of said housing and in engagement with said switch arm.

References Cited by the Examiner

UNITED STATES PATENTS

| | | | |
|---|---|---|---|
| 2,635,157 | 4/1953 | Flight et al. | 200—140 |
| 2,767,923 | 10/1956 | Matthews | 200—140 |
| 2,913,562 | 11/1959 | Weber et al. | 200—140 |

BERNARD A. GILHEANY, *Primary Examiner.*

G. J. MAIER, *Assistant Examiner.*